June 7, 1966 J. C. VITTONE 3,254,902
AUTOMOTIVE ANTI-SWAY BAR
Filed June 30, 1964
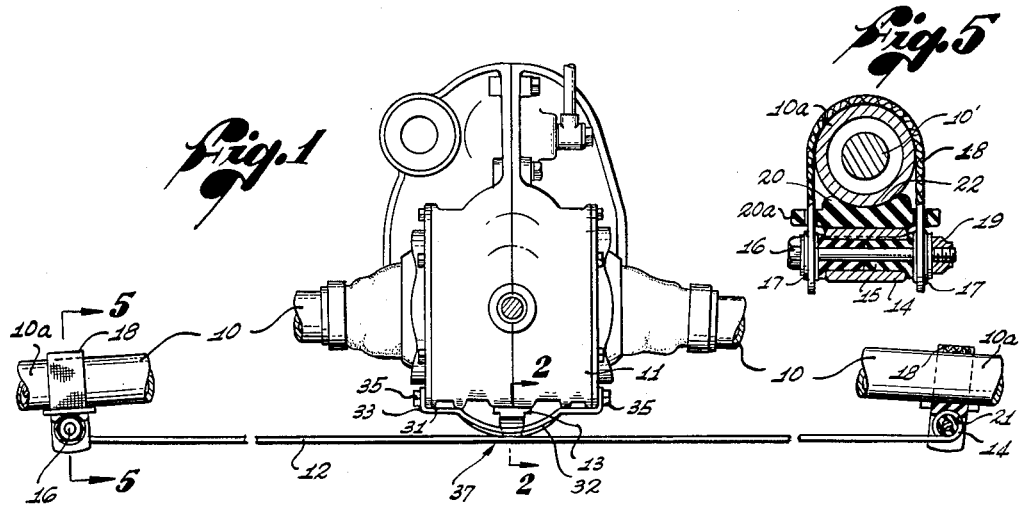
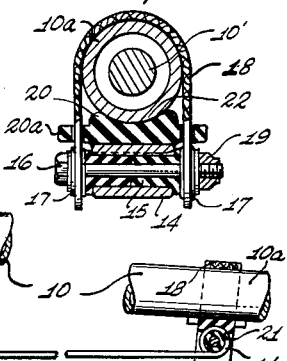
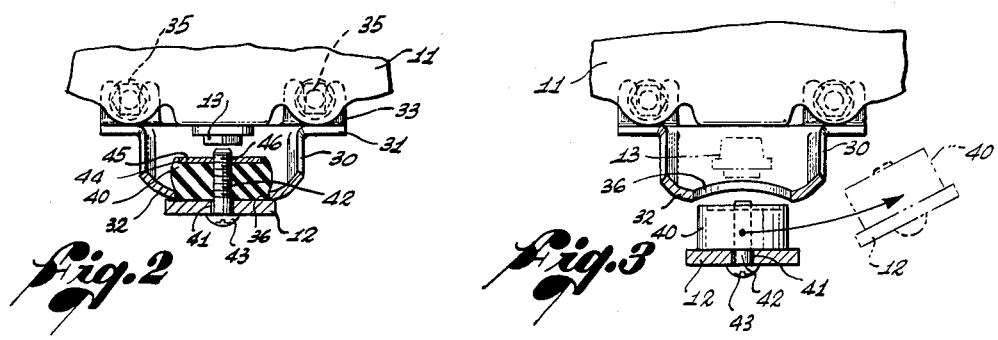
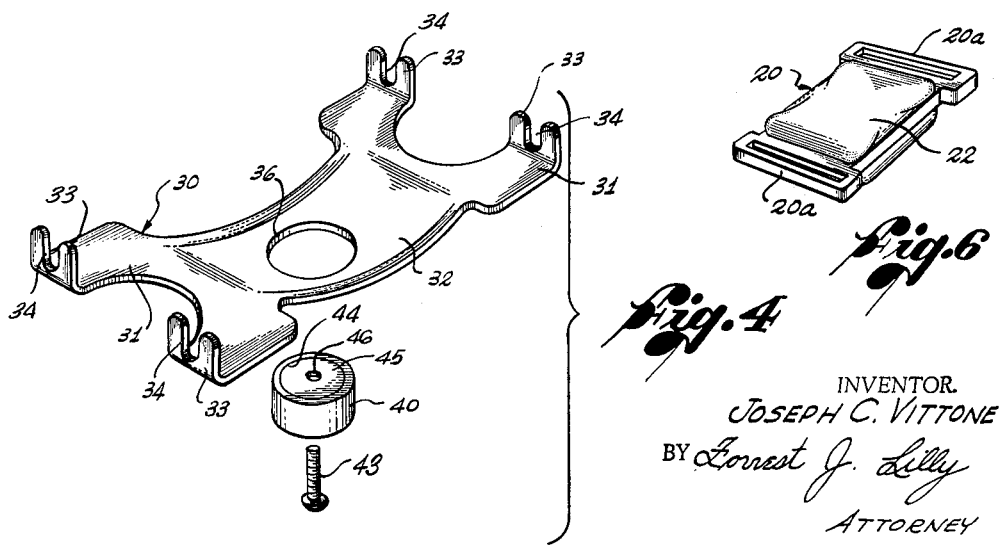
INVENTOR.
JOSEPH C. VITTONE
BY Forrest J. Lilly
ATTORNEY

United States Patent Office 3,254,902
Patented June 7, 1966

3,254,902
AUTOMOTIVE ANTI-SWAY BAR
Joseph C. Vittone, P.O. Box 169, Riverside, Calif.
Filed June 30, 1964, Ser. No. 379,204
3 Claims. (Cl. 280—124)

This invention relates generally to flat or leaf spring type anti-sway or stabilizer bars for swing-axle automobiles.

Such devices contribute stability and reduce sway in swing-axle automobiles under various conditions such as on turns, in gusty winds and on rough roads. These advantages are known in the art. Reference may be had to my prior Patent No. 2,992,835 for a disclosure and discussion of such a device.

The present invention is directed to improvements in such anti-sway or stabilizer bars. As shown in my aforesaid patent, the leaf spring is secured at its two ends to the axle housings near the wheels, in a position under the axle housings and the transmission case, and is secured at its center to a bracket which is, in turn, secured to the transmission case. In a partciular automobile often equipped with such a device, the transmission case has an oil drain plug located over the sway bar and its mounting bracket; and the operation or removing and re-installing the anti-sway bar and bracket to permit oil draining is a time consuming operation. An object of the present invention is to provide such an anti-sway bar and its mounting bracket with improvements by which oil draining from the transmission case is very greatly facilitated.

Other objects relate to improved mountings for the ends of the anti-sway bar on the axle housings, and will become evident in the course of the following detailed description of a present illustrative embodiment of the invention, wherein reference is had to the accompanying drawings, in which:

FIG. 1 is a schematic partially broken away elevational view looking forwardly towards the transmission case and axle housing of a conventional swing-axle automobile, showing the anti-sway bar of the invention in side elevation as seen from the rear end of the automobile, the wheels and other conventional portions of the rear end suspension being omitted;

FIG. 2 is a view taken in accordance with line 2—2 of FIG. 1;

FIG. 3 is a view similar to FIG. 2 but showing alternative positions;

FIG. 4 is an exploded perspective view of a mounting bracket, rubber block and fastening screw;

FIG. 5 is a transverse section taken on line 5—5 of FIG. 1; and

FIG. 6 is a perspective view of a rubber cushion employed in the invention.

In the drawings, the usual swing-axle housings for the rear end of a swing-axle automobile are designated at 10, and are seen to join opposite sides of the transmission case 11, which is located in alignment therewith, with provision for swinging on pivot axes relative to the transmission case, in the usual fashion. These housings 10 will be understood to contain the usual swing axles 10′ (FIG. 5), with the usual universal pivot couplings to the transmission inside case 11. Wheels and other conventional parts are not shown, but may be, illustratively, as indicated in my aforesaid earlier Patent No. 2,992,835.

The anti-sway bar is designated by numeral 12, and comprises a long, flat, leaf spring, normally substantially straight, which is disposed under the rear axle housings 10 and the transmission case, and extends to the outer and portions 10a thereof, somewhat short of the wheels, as in my said earlier patent. It passes below the transmission case 11 at a certain spacing distance or clearance, as shown, and, in a well-known swing-axle automobile of European manufacture, passes directly below the oil drain plug 13 in the bottom of the transmission case.

The ends of the bar or spring 12 are rolled to form eyes 14, and in these eyes are mounted rubber bushings 15, which receive bolts 16. Each bolt 16 passes through metal eyelets 17 in the two ends of a fabric stirrup 18, formed typically of strong rayon or nylon belting or the like. The stirrup is looped over the corresponding end portion 10a of the axle housing, and bolt 16 then inserted and fastened by nut 19.

A rubber pad 20 is placed between each cylindrical spring eye 14 and the axle housing. It is molded to have a concave lower seating surface 21 which conforms to and engages eye 14, and, at right angles thereto, a concave upper seating surface 22 which conforms to and engages the axle housing portion 10a. The pad 20 is further preferably provided at its ends with belt loops 20a which form slots to loosely receive the two arms of the stirrup, and function to keep the pad in assembly with the stirrup. When assembled, the stirrups fit snugly over the axle housing, without slack, and the rubber pad is in contact with both the eye 14 and the axle housing, and forms a cushion therebetween.

The center of the spring 12 is secured to the transmission case 11 through a mounting bracket 30, which may be a sheet steel stamping. This bracket comprises two ends 31, adapted to engage the underside of the transmission case 11 near the side faces of the latter, and a downwardly bowed intermediate arcuate part 32 which desends to a level sufficient to clear drain plug 13, and at the same time contact the upper side of the spring 12. Each end part 31 has, at each of its two ends, an upwardly bent tab 33 furnished with a vertical slot 34; and the slotted tabs are positioned to engage around transmission case machine screws 35. Thus, the transmission case is secured on each side by a number of machine screws, such as 35, and two of these on each side are located near the lower edge of the transmission case, and on opposite sides of the drain plug 13. Accordingly, to mount the bracket 30, these particular screws 35 are loosened a few turns, and the bracket 30 then put in place, with the slotted tabs 33 engaging over the shanks and under the heads of said screws, which are then tightened.

The bowed portion 32 of the bracket 30, directly under drain plug 13, is formed with a hole 36, large enough to pass the stream of oil flowing from the transmission case outlet when plug 13 is removed.

The connection 37 between the bracket 30 and the spring 12 is such as permits ready and convenient disconnection therebetween, and such as also permits the spring 12 to be swung to one side of oil hole 36 when the disconnection has been made (as indicated in FIG. 3), so as to remove the obstruction underlying the oil hole 36 and thus permit draining of the transmission.

A somewhat flexible rubber disc or plug 40 overlies a centered drill hole 41 in spring 12, and has an axial bore 42 to receive the threaded shank of a screw 43 reaching up through drill hole 41, and has also, embedded and bonded within a counterbore 44 in the upper side thereof, a metal disc or nut 45 with an axial threaded hole 46 adapted for threaded engagement by screw 43. When screw 43 is tightened, rubber plug 40 is compressed between spring 12 and the disc, and is caused to bulge radially, as appears in FIG. 2, so as to be retained positively within the hole 36, with most of its bulk above the top surface of spring 12. When the screw 43 is loosened, rubber plug 40 contracts radially to its normal diameter, which is such as just permits the plug to pass freely through hole 36.

FIG. 1 shows the position of the parts as they would appear with the vehicle on a hoist, with the wheels off the ground. In this condition, the swing axles assume a downward inclination, about as shown in FIG. 1, spring 12 remaining substantially or nearly straight. The spring 12 is supported at this time by its center connection 37 with the bracket 30, and there is some axle and wheel weight borne by the connection 37. It will be understood that when the vehicle is resting normally on its wheels, the swing axles are substantially horizontal, and the spring 12 is curved upwardly accordingly.

To release the connection between the spring 12 and the bracket 30, the screw 43 is loosened until rubber plug 40 is contracted sufficiently to pass through hole 36. When this has been accomplished, the weight of the swing axles and wheels causes these parts, together with the spring 12 and plug 40, to drop a limited distance, as to the position indicated in FIG. 3, where the plug 40 is seen to be below the lower side of the bracket 30. The spring 12 can then be thrust to one side, as indicated by the arrow and the phantom line position of FIG. 3, to clear the bracket hole 36 and the oil drain outlet immediately above. In this operation, the stirrups simply turn on the axle housings. In case of accumulated dirt, corrosion, or too tight a fit of the stirrups around the axle housings, it may occasionally be required that the stirrup be loosened from its fastening bolt on one side to facilitate this operation. Ordinarily, however, the stirrup will turn easily.

To re-assemble the device, the spring 12 is swung back under the axle housings, and it is then necessary to elevate the rubber plug and spring and then recompress the rubber disc to lock the parts in assembly as shown in FIG. 2. This requires lifting the swing axles back to the position of FIG. 1. Such may be readily accomplished by lowering the vehicle until the wheels again rest on the ground, or simply by lifting or blocking the axles up in this position.

In service, the stabilizer bar can rock limitedly on the downwardly bowed portion of the mounting bracket 30, which acts as a fulcrum means, with any unequal pivotal movements of the swing axles relative to one another, and such action is yieldingly and resiliently accommodated by corresponding deformation movements of the rubber plug 40. Such movements, however, are yieldingly resisted and minimized by the stabilizer bar itself.

The drawings and description are illustrative of a present preferred embodiment of the invention, and it will be understood that various changes in design, structure and arrangement may be made without departing from the spirit and scope of the appended claims.

I claim:
1. A stabilizer bar and mounting therefor on an automotive vehicle having rear swing axles and axle housings extending outward in opposite directions from a transmission case, comprising:
   an elongated flat metal spring positionable below the axle housings and the transmission case and equipped at its ends with means for connection to the axle housings,
   a mounting bracket for said spring attachable to the underside of said transmission case, said bracket having a lower wall portion adapted for engagement with the upper side of the spring at the center thereof, said wall portions having an aperture extending therethrough,
   a rubber plug secured to said spring on the top and at the center thereof, said plug being receivable in said aperture and projectable above said wall portion of said bracket,
   and means for compressing said plug axially to cause it to bulge radially to a size larger than said aperture in the portion thereof which projects above said wall portion of said bracket.

2. The subject matter of claim 1, wherein said means for compressing said plug comprises a screw extending upwardly through said spring and said rubber plug, and a threaded nut element for said screw bearing downwardly on said rubber plug.

3. A stabilizer bar and mounting therefor on an automotive vehicle having rear swing axles and axle housings extending outward in opposite directions from a transmission case, comprising:
   an elongated flat metal spring positionable below the axle housings and the transmission case and formed at its ends with cylindrically formed eyes,
   flexible stirrups looped over said axle housings and having arms disposed at opposite ends of said eyes,
   bolts extending through said eyes and secured to said arms of said stirrups,
   and rubber pads between and in engagement with said axle housings and said eyes, said pads being shaped to conform to said axle housings and eyes, and having slots therein along two edges thereof for reception of the arms of said stirrups.

References Cited by the Examiner
UNITED STATES PATENTS
2,992,835  6/1961  Vittone _____ 280—124
FOREIGN PATENTS
1,161,498  3/1958  France.

BENJAMIN HERSH, *Primary Examiner.*

W. A. MARCONTELL, *Assistant Examiner.*